United States Patent [19]

Rettie

[11] Patent Number: 5,009,138

[45] Date of Patent: Apr. 23, 1991

[54] ROTARY CUTTER DEVICE

[76] Inventor: C. William Rettie, 306 Hickory Dr., Chapel Hill, N.C. 27514

[21] Appl. No.: 505,725

[22] Filed: Apr. 6, 1990

[51] Int. Cl.$^5$ .............................................. B27C 5/02
[52] U.S. Cl. ........................................ 83/413; 83/733
[58] Field of Search ................ 83/733, 646, 439, 413; 82/1.3, 19

[56] References Cited

U.S. PATENT DOCUMENTS

| | | | |
|---|---|---|---|
| 3,473,580 | 10/1969 | Dunn et al. | 83/413 |
| 3,621,574 | 11/1971 | Yanke et al. | 30/290 |
| 3,797,543 | 3/1919 | Schell | 144/145 |
| 3,885,611 | 5/1975 | Schell | 144/145 R |
| 4,021,025 | 5/1977 | Frame | 266/58 |
| 4,120,220 | 10/1978 | Mullen | 83/886 |
| 4,233,736 | 11/1980 | Duggins et al. | 30/293 |
| 4,662,073 | 5/1987 | Prusman | 33/27.11 |
| 4,790,222 | 12/1988 | Morgan | 82/1.3 |

OTHER PUBLICATIONS

Artistic Photo Plate Creations, Inc. presents the Ultra 3000 System 1A Tremendous Opportunity.
Circle Cutter Apparatus by Artistic Photo Plate Creations, Inc. Bothell, WA 98021.
Oval Circle Mat Cutters, Straight Edge Mat Kit, Oval Mat Kit, and EZ Hand Mat Cutter, Leichtung Workshop, Inc.

Primary Examiner—Douglas D. Watts
Assistant Examiner—John M. Husar
Attorney, Agent, or Firm—Steven J. Hultquist

[57] ABSTRACT

A rotary cutter device, wherein the material to be cut is placed on a table which is rotatably mounted on a base, and cut by a cutting implement attached to an articulated cutter arm assembly mounted on the base. The articulated cutter arm assembly movably extends over the rotatable table in a direction generally perpendicular to the axis of rotation of the table, with the cutting implement being securable in any of a plurality of positions along the radius of the table by movement of the articulated cutting arm. The rotatable table is mounted on a swing arm to allow the rotatable table to move with respect to the base, and detachably mounted template cams are employed, which rotate conjointly with the table and a template-cam engaging bearing, such that the axis of rotation of the table can be displaced with respect to the cutter arm to trace a shape congruent with the shape of the template cam during conjoint rotation of the table and template cam.

17 Claims, 4 Drawing Sheets

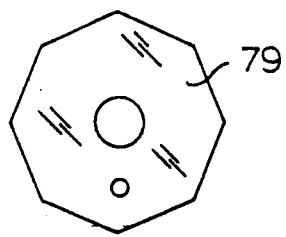
FIG. 9
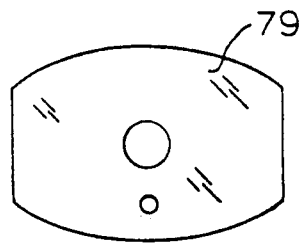
FIG. 10
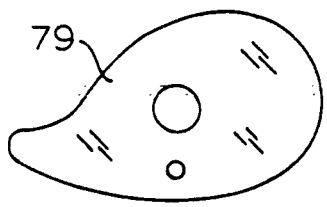
FIG. 11
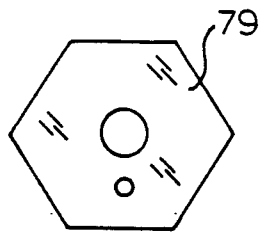
FIG. 12
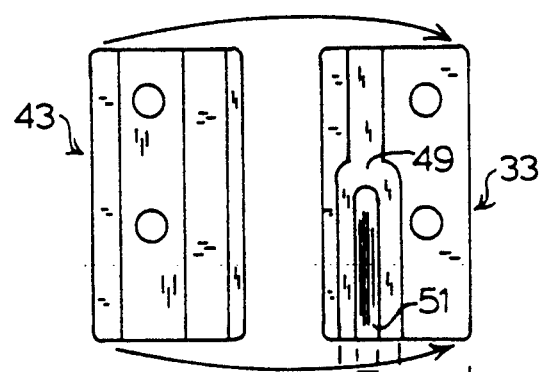
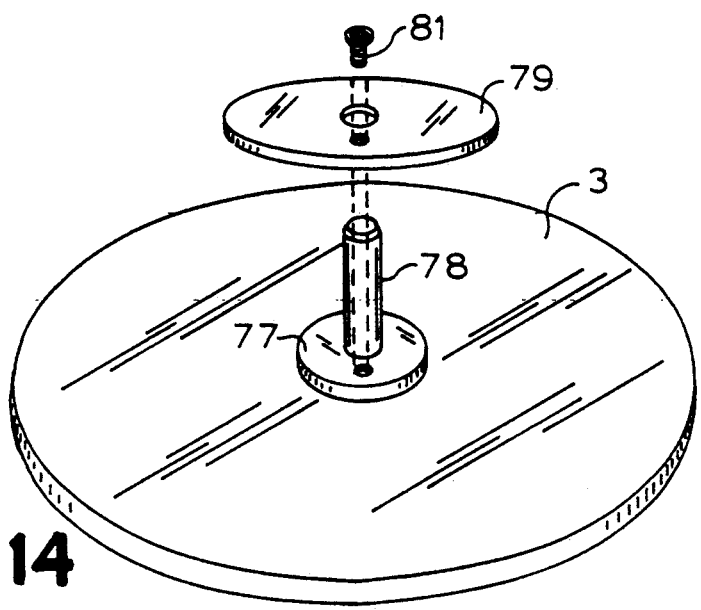
FIG. 13
FIG. 14

ROTARY CUTTER DEVICE

BACKGROUND OF THE INVENTION

1. Field of the Invention

This invention relates generally to devices for cutting or scribing circles and other shaped forms onto material, especially devices which support the material to be cut on an integrally mounted table. Such devices can typically be used for cutting or drawing on photographs, paper, cloth, plastics, glass, metal, or similar thin sheet material, but the invention is not restricted to such applications.

2. Description of the Prior Art

Several types of devices for cutting shapes in photographs, photo mats, or similar materials have been employed in the art. One rotary cutter device for making only circular cuts in photographs or similar materials has been marketed for several years by Artistic Photo Plate Creations, Inc. of 120 W. Dayton Street, Suite A-2, Edmonds, Wash. 98020. This rotary cutter device employs a circular stand with a rotatable table mounted to the center of the stand. There is additionally an arm extending outwardly and upwardly from the stand which in turn supports a beam member disposed over the table. A cutting implement can be mounted on that beam member and slidably moved to various positions along that beam member over the rotatable table. The beam member always overlies the table in the same position regardless of the position of the cutting implement or the desired size of the circle to be cut.

Another circle cutter apparatus has recently been commercialized by Artistic Photo Plate Creations, Inc. This precision circle cutter has a rotatable table on which the material to be worked upon is placed. The cutting implement is mounted on an articulated cutter arm which can be adjusted to overlie the rotatable table only as far as necessary to have the cutting implement contact the material to be worked upon at the selected point. Rotation of the table then results in a circular cut on the material. This device, however, is only capable of making circular cuts in materials.

Other devices for cutting circular or oval shapes in photographic mats or similar materials have been marketed by Leichtung Workshop, Inc. of 4944 Commerce Drive, Cleveland, Ohio 44128, in systems that involve securing the device on the object to be cut and having a cutter arm rotate about the device to make a circular cut, or that make use of a peg and guide system to have the device make an oval cut. These devices are marketed by Leichtung as the Oval/Circle Mat Cutters, Straight Edge Mat Kit, Oval Mat Kit, or the EZ Hand Mat Cutter.

Additionally, several patents pertain to devices similar to the ones noted above. For example, U.S. Pat. No. 3,621,574 teaches a photographic print circle cutter consisting of a central disc on which is mounted a rotatable arm with a cutting implement that can be adjusted to follow any of a number of circular patterns at various radii from the center. This device, however, requires that the disc be placed on top of or adjacent to the material to be cut so that the axis of rotation of the cutter arm is over the center of the circular shape of the material to be cut.

U.S. Pat. No. 4,233,736 teaches a pressure sensitive picture frame mat cutter which focuses primarily on a pressure sensitive adjustment for the cutting implement to control the depth of the cut in a picture frame mat. This device, through a cable attached thereto used in conjunction with pins placed on the material to be cut, can inscribe circular, oval or other shapes on the material to be cut.

U.S. Pat. No. 4,790,222 teaches an apparatus for cutting various forms out of a picture frame mat, and is based upon an adaptation of a mechanism known as the "Oval Master", manufactured by C & H Manufacturing Company of Jackson, Miss.; this patent teaches a system of gears, chains, and attachments to the Oval Master device to allow reciprocating motion of an arm attached to the cutting implement to form irregular or scalloped shapes on circular, oval, or other shapes outlined by the device.

Similar devices can be used in different applications, such as appear in U.S. Pat. No. 4,021,025, a circle cutter particularly adapted to be used to position a welding or cutting implement to trace a circular shape. This device requires placement onto the material on which the cut is to be made.

U.S. Pat. No. 3,797,543 teaches a material shaping platform with multiple or exchangeable templates, a rotatable platen mounted to a mechanism allowing reciprocating movement in accordance with the engagement of template cams with the rotating mechanism for the shaft of the rotatable platform. This device does not have any provision for an integrally attached mechanism for supporting and positioning a cutting implement.

U.S. Pat. No. 4,120,220 teaches a stationary cutter device which can secure a cutting implement and under which glass or similar materials to be inscribed may be moved.

Of general background interest is U.S. Pat. No. 4,662,073, which teaches an infinitely variable drawing instrument involving connected arms moved by gearing mechanisms to draw shapes on materials mounted on a rotary platform.

The disadvantage inherent in many of these prior art inventions is that they require placement of the cutting or scribing device on the material to be worked upon or can make only circular cuts. The present invention allows the material to be worked upon to be placed on the rotatable table with the capability of a variety of shapes being made on the material by the single point of the cutting or scribing implement bearing against the material, which in turn is supported by the table. While the prior art marketed by Artistic Photo Plate Creations, Inc. of Bothell, Wash. provides a platform supporting the material and an articulated cutter arm with only the single point of the cutting implement contacting the face of the photograph or similar material, it is only capable of making circular cuts. The earlier prior art of Artistic Photo Plate Creations, Inc. further has the disadvantage of having a beam member hanging over the rotatable table at all times that the cutting implement is in use, with that beam member always being in the same position regardless of the radius of the cut being made. The present invention incorporates the articulated cutter arm, which can be adjusted to overlie the platen only as far as necessary to have the cutting implement make contact with the material at the point the incision is to be made, and which thus allows a clear view of the material and the cut being made and thus providing conditions for finer control of the cutting process.

Further, the prior art of Artistic Photo Plate Creations, Inc. does not provide for means of making other than circular cuts in the material to be cut. The present invention, through its use of template cams and a mounting for the rotatable table that is movable to allow it to be displaced in congruence with the form of the template cam, allows, in addition to circles, numerable shapes as presented by the template cam to be cut or inscribed on the material to be worked upon. Thus, the invention, in addition to having the advantages noted above of the articulated cutter arm, also allows various shapes of template cams to be cut.

The invention provides simple construction, ready assembly, easy interchange of template cams, and the articulated cutter arm assembly which is unique among the prior art pertinent to this invention.

SUMMARY OF THE INVENTION

The present invention relates generally to a rotary cutter device. The material to be cut is placed on a table which is rotatably mounted on a base. The material is cut by a cutting implement such as a blade or stylus; this cutting implement is attached to an articulated cutter arm assembly mounted on the base and which movably extends over the rotatable table in a direction generally perpendicular to the axis of rotation of the table. The cutting implement can be secured in any of a plurality of positions along the radius of the table by movement of the articulated cutting arm.

The invention includes an articulated cutter arm assembly mounted on the base. The mount for the rotatable table is mounted on a swing arm which is pivotally mounted on the base to allow the axis of rotation of the rotatable table to move with respect to the base. The device further has detachably mounted template cams which rotate conjointly with the table and a template-cam engaging bearing. The template cam cooperates with the template cam-engaging bearing causing the axis of rotation of the table to be displaced with respect to the cutter arm to trace a shape congruent with the shape of the template cam during conjoint rotation of the table and template cam. The device is further provided with a biasing means to tensionally maintain the template cam in contact with the template cam-engaging bearing.

Other aspects and features of the invention will be more fully apparent from the ensuing disclosure and claims.

BRIEF DESCRIPTION OF THE DRAWINGS

FIG. One is an upper front perspective view of the precision circle cutter, which is the prior art of Artistic Photo Plate Creations, Inc.

FIG. Two is a upper rear perspective view of the entire rotary cutter device in the invention, showing the base, articulated cutter arm assembly, swing arm, and rotatable table with a template cam attached.

Figure 1:
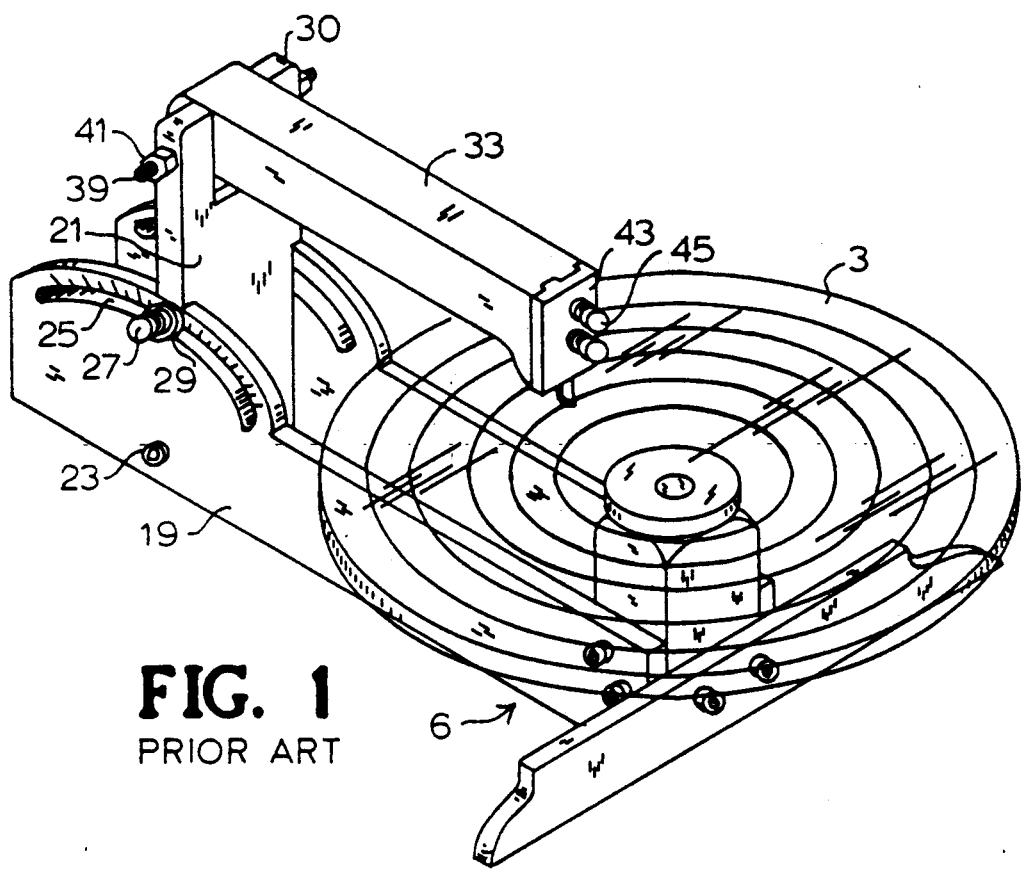
Figure 2:
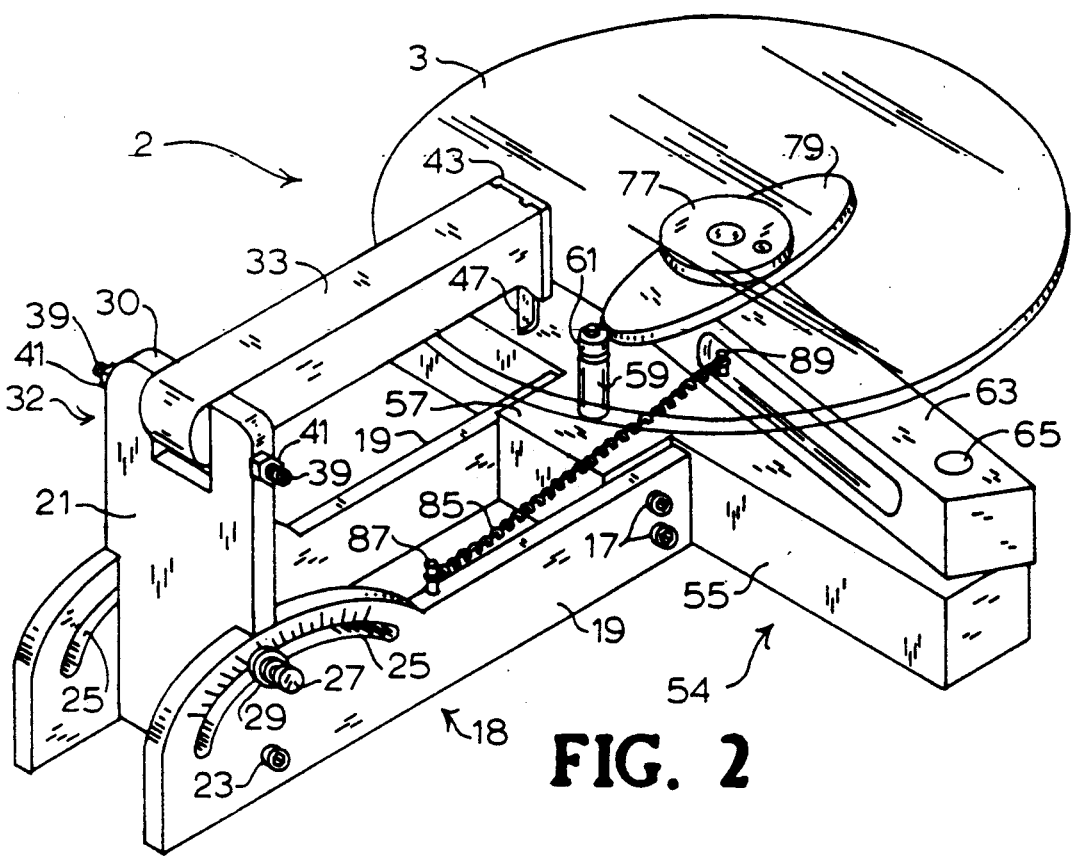
Figure 3:
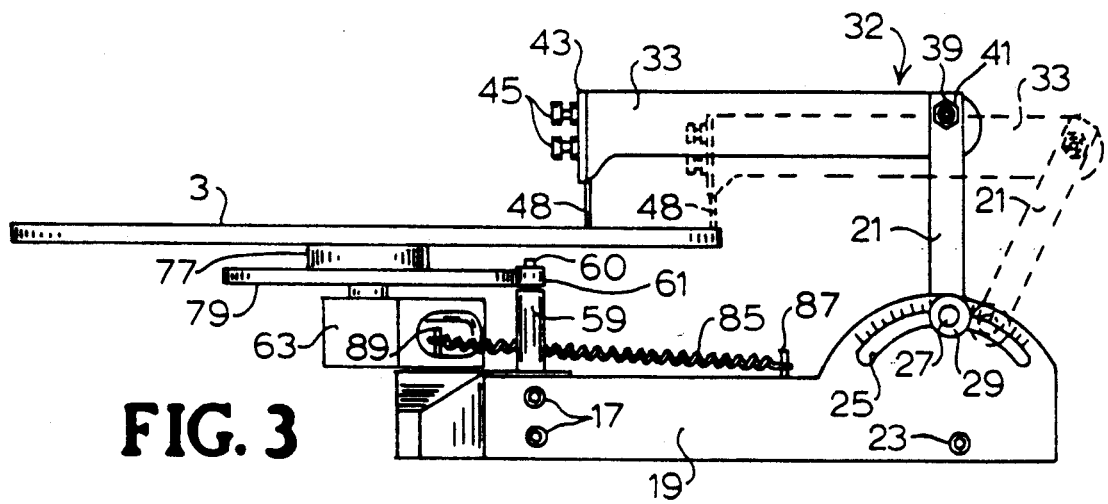
Figure 4:
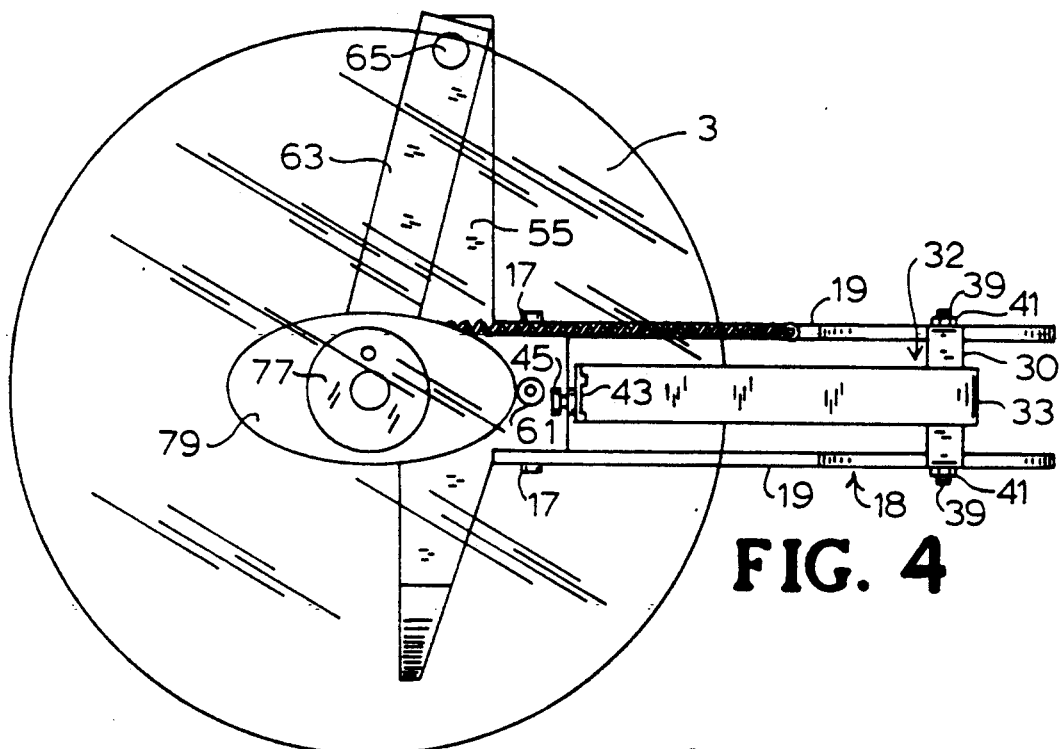
Figure 7:
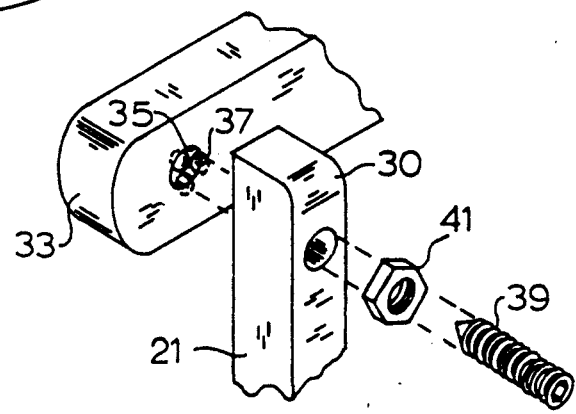
Figure 5:
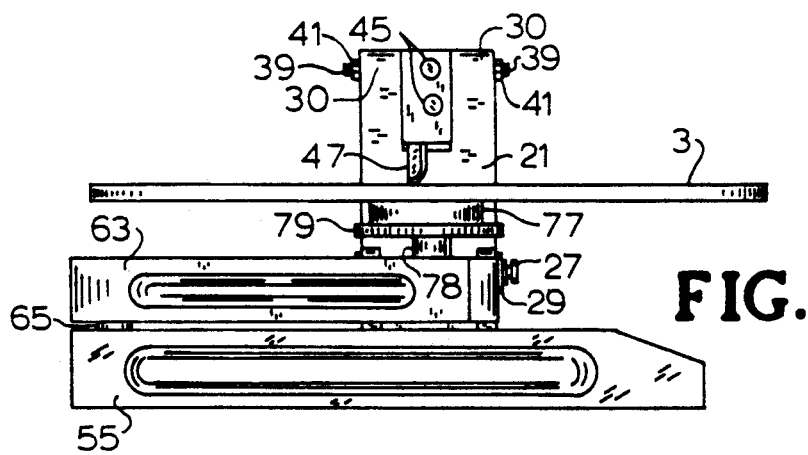
Figure 6:
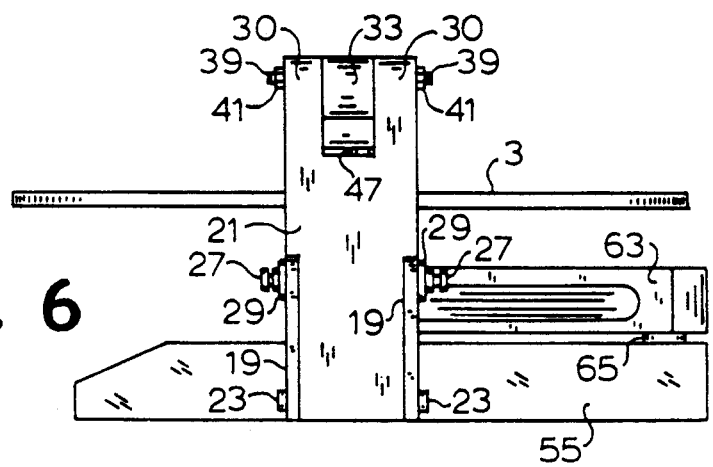
Figure 8:
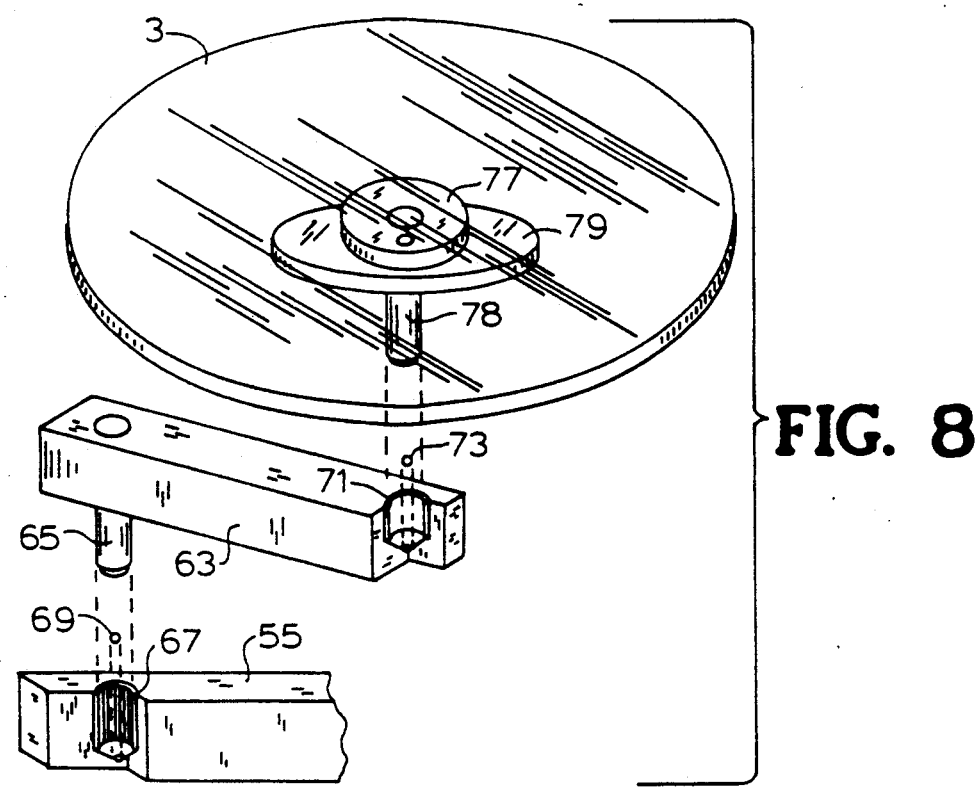

FIG. Three is a side elevation view of the rotary cutter device in FIG. Two.

FIG. Four is a top plan view of the rotary cutter device in FIG. Two.

FIG. Five is a front elevation view of the rotary cutter device in FIG. Two.

FIG. Six is a rear elevation view of the rotary cutter device in FIG. Two.

FIG. Seven in an exploded perspective view of the pivotal attachment of the main cutter arm to the support arm.

FIG. Eight is an exploded perspective view of the rotatably mounted swing arm and the rotatable mounting of the table to the swing arm of the rotary cutter device in FIG. Two.

FIGS. Nine through Twelve are representations of various embodiments of template cams adapted for use on the rotary cutter device of FIG. Two.

FIG. Thirteen is an exploded side elevation view of the main cutter arm showing the slotted and grooved surfaces of the main cutter arm and detached mounting plate and various embodiments of cutting implements.

FIG. Fourteen is a bottom perspective view of the rotatable table and template cams of the cutter device in FIG. Two.

DETAILED DESCRIPTION OF THE INVENTION, AND PREFERRED EMBODIMENTS THEREOF

The disclosed invention provides precise means of making circular or other shaped cuts in materials. FIG. Two presents a view of the invention and FIG. One shows the prior art of Artistic Photo Plate Creations, Inc.

Referring to FIGS. One and Two, in both the prior art and in the invention an articulated cutter arm assembly 32 is attached to a base 54 (FIG. Two) or base 6 (FIG. One). The base may be of any shape that provides suitable support for the components of the invention described below. An elongate base is shown in FIGS. One and Two.

The base 54 or 6 rotatably supports a table on which the material to be cut is placed. Such table may be of any suitable size or shape to present the material to be worked upon and may be a platen 3 as shown in the drawings. The articulated cutter arm 32 in both the invention and the prior art of Artistic Photo Plate Creations, Inc. positions cutting or scribing implement 48 over platen 3 on which the material to be worked upon (not shown) is placed.

Base 54 has elongated main section 18 formed by two parallel main base plates 19. Support arm 21 movably fits between the parallel main base plates 19 and is rotatably mounted therebetween by screw fasteners 23 inserted through main base plates 19 into threaded apertures in support arm 21 positioned to allow the support arm to rotate about its lower end. Support arm 21 is further securable in a selected orientation by thumb screw fasteners 27 and washers 29, or similar means, extending inwardly through arcuate shaped guide slots 25 in main base plates 19 into threaded apertures in support arm 21. Fasteners 27 can be used to secure the position of support arm 21 at a position anywhere along the guide slot 25 as support arm 21 rotates about the axis of the fasteners 23 securing support arm 21 to the base 54.

Cutter arm 33 is pivotally supported on the distal end of support arm 21 from the base 54. Distal end of support arm 21 comprises two prongs 30 with a space therebetween into which cutter arm 33 fits. As appears in FIG. Seven, externally threaded screw fastener 39 with a conical tip is threaded through threaded apertures in prongs 30 of support arm 21 to engage cutter arm 33. Cutter arm 33 on each side adjacent to the threaded apertures in prongs 30 has a cavity 35 alignable with threaded apertures in prongs 30. Each cavity 30 has positioned therein a plurality of ball bearings 37 disposed to receive therebetween the conical tip of fastener 39. Nuts 41 are threaded onto fasteners 39 to lock fastener 39 in a position along its axis of travel. Fasteners 39 are threadably advanced through threaded apertures in prongs 30 until the conical tip of the fastener contacts ball bearings 37, thereby allowing free pivotal motion of cutter arm 33 about support arm 21.

Mounting plate 43 is detachably securable by suitable means, such as screw fasteners 45, to main cutter arm 33 at its end opposite the support arm 21. End of cutter arm 33 has a slot 49 therein of a size and shape suitable for receiving cutting or scribing implement 48. Cutting or scribing implement 48 may be of any type or shape suitable for the work to be done on the material placed on the platen 3. For example, implement 48 may be a cutting blade 47. In this invention, the end of cutter arm 33 additionally has a groove 51 therein, not found on the Artistic Photo Plate Creations, Inc. prior art, suitable for alternatively receiving a cylindrically shaped mounting shaft for a scriber 53 or a wheeled cutter 52 as a cutting or scribing implement. Wheeled cutter 52 has attached to the mounting shaft a support for an axle about which a circular cutting device, such as a carbide wheel with sharpened outer edges, may rotate. Cutting blade 47 or scriber 53 or wheeled cutter 52 is attached to the end of cutter arm 33 when plate 43 is securely attached to end of said cutter arm by fasteners 45, clampling the cutting blade or mounting shaft of the cutting implement therebetween. Cutter arm 33, rotating about support arm 21, can be positioned so that cutting or scribing implement 48 contacts the material on platen 3 to be worked upon.

Base 54 may be of any form or construction that provides an acceptable platform to support platen 3, swing arm 63, and articulated cutter arm assembly 32. The invention as drawn has base 54 comprising main base plates 19 and transverse platform section 55 with foot extension 57 adapted to fit between the parallel main base plates 19 and to receive fasteners 17 to securely fasten the main base plates 19 and transverse section 55 together in substantially a "T" shape.

Foot extension 57 has solidly mounted thereto an upwardly extending cylindrical post 59, which mounting can be by press fitting cylindrical post 59 into a suitably sized bored hole in foot extension 57. Upwardly extending cylindrical post 59 is bored along its axis to receive therein axle 60 which is press fit into cylindrical post 59; template cam-engaging bearing 61 is mounted on axle 60 and disposed to rotate about the axis of cylindrical post 59. This arrangement or any other suitable arrangement can be used to securely mount template cam engaging bearing on base 54 so that it can cooperate with the template cam 79.

Transverse platform section 55 is bored on one end to create a cylindrical cavity capable of receiving roller bearing 67 press fit into said hole. The cylindrical cavity in transverse platform section 55 is countersunk in the center thereof to create a depression into which ball bearing 69 may be placed, which ball bearing supports swing arm 63 when inserted through roller bearing 67 to be rotatably mounted on transverse platform section 55.

Axle 65 is mounted on one end of swing arm 63 by any suitable means, such as press fitting axle 65 into an appropriately sized hole in swing arm 63. Axle 65 is of cylindrical shape, slightly tapered to a smaller cross-section at its outward end, to rotatably fit into and cooperate with roller bearing 67 and ball bearing 69 in lateral platform section 55.

Swing arm 63 rotatably supports platen 3 by suitable means, such as brass bushing 71 inserted in a cavity in swing arm 63, with said cavity further bored in the bottom center to create a depression into which ball bearing 73 may be placed to provide support for platen 3 in a manner similar to that described above for the rotatable support of swing arm 63.

Platen 3 is made of glass or other appropriate material to support the material to be worked upon and is securely attached to mounting base 77 by suitable means, such as an adhesive. Mounting base 77 is attached to one side of platen 3 in the center thereof. Mounting base 77 has a depending cylindrical leg 78 adapted to fit into brass bushing 71 in swing arm 63. Mounting base 77 further has a threaded hole therein to receive screw fastener 81. Template cam 79 is securely attached to the bottom of mounting base 77 by means of screw fastener 81. The template cam can be in any of a variety of shapes, including, but not limited to, those forms appearing in FIGS. 9 through 12.

The depending cylindrical leg 78 from mounting base 77 is rotatably mounted on swing arm 63 such that the template cam 79 sits adjacent to and cooperates with template cam-engaging bearing 61 located atop the cylindrical post 59 on platform base 54.

Biasing means for maintaining template cam 79 in contact with template engaging bearing 61 is provided by means of a biasing spring 85 which is tensionally attached to platform member 54 by means of an attachment pin 87 inserted into main base plate 19 and attaching pin 89 mounted on swing arm 63.

To cut a shape on a suitable material using the preferred embodiment, the desired template cam 79 is selected and mounted on platen base 77. Platen 3 is in turn mounted on swing arm 63. Support arm 21 is positioned along guide slot 25 to place the cutting or scribing implement 48 at the end of cutter arm 33 at a desired position along the radius of platen 3. Positioning of the end of cutter arm 33 can be aided by any suitable indexing means on the device. By way of example and not limitation, such indexing device may comprise a registration mark inscribed on the side of support arm 21 and registration marks inscribed along the edge of guide slot 25 so that the position of cutter arm 33 along the radius of platen 3 may be read from the registration mark along guide slot 25 adjacent to the registration mark on support arm 21. Support arm 21 can be securely fastened in the selected position by thumb screws 27 to secure its position along the guide slot. As the platen is rotated its vertical axis of rotation is horizontally displaced with respect to the base 54 in a manner conforming to the shape of the template cam which rides along template cam-engaging bearing 61. Swing arm 63, which supports platen 3, rotates as necessary to allow the horizontal displacement of the platen's vertical axis of rotation. Biasing spring 85 is attached between swing arm 63 and base 54 to maintain the template engaging cam 79 in contact with the template cam-engaging bearing 61 during rotation of platen 3. Other suitable mechanisms can be used to provide for the displacement of the rotatable platen with respect to the cutting or scribing implement. For example, the template cam can be rotatably mounted on the base 54 to cooperate with the spindle or mounting base 77 as it rotates with platen 3. Displacement of the axis of rotation of platen 3 with respect to the cutting or scribing implement 48 might also be controlled by non-cam control devices.

When the desired work has been done on the material on the platen, the cutter arm 33 may be lifted and the material removed from the platen.

The rotary cutter device may be constructed of any material of suitable strength, including, but not limited to, steel, cast iron, aluminum, brass or plastic.

The cutting or scribing implement can be any type of tool to cut, inscribe, or draw upon the material to be worked upon. Although the drawings accompanying this disclosure reflect blades and other cutting tools, the utility of the invention is not so limited. As used in this application, the words "cut" or "cutting" are to be construed to include all cutting, drawing or other implements that might be attached to the cutter arm for the purpose of working on the material placed on the platen. Such tools would include, but not be limited to, blades, styli, pencils, pens, or similar instruments efficacious for performing the desired work on the material. The material to be worked upon could be cut, shaped, impressed, or drawn upon by such cutting or scribing implement. Examples of materials that might be worked upon by this invention include paper, photographs, film stock, plastics, gasket material, rubber, glass, metals, and other thin sheet material.

While the invention has been described with reference to the drawings noted above, it would be appreciated that other variations, modifications, embodiments are possible, and accordingly all such variations, modifications, and embodiments are to be regarded as being within the spirit and scope of the invention as claimed.

What is claimed is:

1. A rotary cutter apparatus, comprising:
   (a) a base;
   (b) an articulated cutter arm assembly, comprising:
      (i) a main cutter arm; and
      (ii) a support arm having first and second ends, with the first end being coupled to the base so as to allow pivotal movement of the first end, and with the second end being coupled to the main cutter arm so as to be pivotally movable with respect thereto, such that the main cutter arm is translatable along a longitudinal direction;
   (c) an elongate swing arm having first and second ends, and coupled at its first end to the base so as to be pivotally swingable about a first axis;
   (d) a rotatable table assembly, rotatable about a second axis parallel to said first axis, mounted on the second end of the swing arm and arranged to accommodate rotation of the table assembly concurrent with pivotal swinging of said swing arm about said first axis;
   (e) a template cam coupleable to said table assembly and rotatable therewith about said second axis;
   (f) a bearing member attached to said base; and
   (g) biasing means interconnecting (i) a portion of the swing arm other than its first end, and (ii) the base, for maintaining said template cam in contact with the bearing member during rotation of said rotatable table assembly about said second axis, concurrently with pivotable swinging of said swing arm about said first axis to the extent required to maintain said contact.

2. A rotary cutter apparatus according to claim 1, further comprising means for detachably securing a cutting implement to a portion of the main cutter arm so that said cutting implement overlies said rotatable table assembly.

3. A rotary cutter apparatus according to claim 1, wherein said base comprises an elongate main section with distal and proximal ends, and a transverse section joined at its medial portion to the proximal end of the elongate main section, such that the base has substantially a "T" shape.

4. A rotary cutter apparatus according to claim 1, wherein the base comprises a guide slot, with fastening means cooperatively engaging said guide slot and said support arm, such that said support arm is securable thereby in a selected orientation in any of a plurality of positions along said guide slot.

5. A rotary cutter apparatus according to claim 1, wherein:
   (A) said elongate swing arm has top and bottom longitudinal faces, with an axle depending downwardly from said bottom longitudinal face at said first end thereof;
   (B) said base has a cavity for receiving said axle and accommodating rotation of said axle therein;
   (C) said top longitudinal face of said elongate swing arm has a cavity therein at said second end thereof; and
   (D) said rotatable table assembly comprises a platen having main top and bottom surfaces, with a spindle attached to said main bottom surface of said platen and depending downwardly therefrom, said spindle being positionable in said cavity in the top longitudinal face of said elongate swing arm at said second end thereof so as to accommodate rotation of said spindle therein during rotation of the rotatable table assembly.

6. A rotary cutter apparatus according to claim 1, wherein said support arm has at least one threaded aperture therein which is alignable with said guide slot, and said fastening means comprises at least one screw fastener extending inwardly through said guide slot and threadably engaging a said threaded aperture in said support arm aligned therewith, said screw fastener being (i) selectively tightenable to securely position said support arm in said selected orientation, and (ii) selectively loosenable to allow translation of said support arm, and movement of said screw fastener along said guide slot, to another selected orientation of said support arm.

7. A rotary cutter apparatus according to claim 4, wherein said guide slot is arcuate-shaped.

8. A rotary cutter apparatus according to claim 2, further comprising indexing means to indicate the position of said cutting implement with respect to said rotatable table assembly.

9. A rotary cutter apparatus according to claim 4, wherein said guide slot has a scale comprising registration marks associated therewith and said support arm has a registration mark thereon which is positionally alignable with said scale to indicate the postion of said main cutter arm relative to the rotatable table assembly, corresponding to the selected orientation of said support arm.

10. A rotary cutter apparatus according to claim 1, wherein said second end of said support arm comprises two prongs in spaced relationship to one another, to receive said main cutter arm therebetween, with said prongs each having a threaded aperture therethrough for threadably engaging therein an externally threaded screw having a conical tip, and said main cutting arm having a cavity alignable with the threaded aperture in each of said prongs to receive a said externally threaded screw which is threaded through said aperture, with each said cavity in said main cutter arm having positioned therein a plurality of ball bearings which contact the conical tip of a said externally threaded screw when said screw is threadably advanced into the cavity, whereby said main cutter arm is fastenable to said support arm to accommodate free pivotable motion of said main cutter arm relative to said support arm.

11. A rotary cutter apparatus according to claim 2, wherein said main cutting arm includes a slotted surface therein, and said means for detachably securing a cutting implement to said main cutter arm comprises a mounting plate which is detachably securable to said cutter arm in a position overlying said slotted surface, to clamp the cutting implement therebetween.

12. A rotary cutter apparatus according to claim 11, wherein said slotted surface in the main cutter arm includes a groove therein to alternatively receive a cutting implement having a cylindrically-shaped mounting shaft.

13. A rotary cutter apparatus according to claim 12, wherein said cutting implement comprises a wheeled cutter with a cylindrically shaped mounting shaft.

14. A rotary cutter apparatus according to claim 1, wherein said biasing means comprises a spring having first and second ends, and tensionally attached at said first end to said base and at said second end to said swing arm to maintain said template cam in contact with said bearing member.

15. A rotary cutter apparatus according to claim 3, wherein said transverse section includes an extension foot secured to said elongated main section, said bearing member comprises an upwardly extending cylindrical post on said extension foot, and a template cam-engaging bearing is positioned at an upper end of the cylindrical post for rotation about the axis of said cylindrical post.

16. A rotary cutter apparatus according to claim 5, wherein said platen is of circular shape and has marked thereon concentric circles about the center of said platen with associated numbers indicating the radii of said concentric circles from the center of said platen.

17. A rotary cutter apparatus according to claim 1, further comprising a kit of template cams of different shapes and/or sizes, adapted to be selectively coupleable to said rotatable table assembly and rotatable therewith about said second axis.

* * * * *